(12) United States Patent
Teranishi et al.

(10) Patent No.: US 10,035,142 B2
(45) Date of Patent: Jul. 31, 2018

(54) HONEYCOMB STRUCTURE

(71) Applicant: NGK INSULATORS, LTD., Nagoya (JP)

(72) Inventors: Makoto Teranishi, Nagoya (JP); Yasushi Kato, Nagoya (JP); Junki Matsuya, Nagoya (JP); Takahiro Honda, Nagoya (JP); Takahiro Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/437,634

(22) Filed: Feb. 21, 2017

(65) Prior Publication Data

US 2017/0274366 A1    Sep. 28, 2017

(30) Foreign Application Priority Data

Mar. 28, 2016  (JP) ................ 2016-064656

(51) Int. Cl.
*B01J 21/04*    (2006.01)
*B01J 35/04*    (2006.01)
(Continued)

(52) U.S. Cl.
CPC ............ *B01J 35/04* (2013.01); *B01D 46/247* (2013.01); *B01D 46/2474* (2013.01); *B01D 53/9413* (2013.01); *B01D 53/9418* (2013.01); *F01N 3/2066* (2013.01); *F01N 3/2842* (2013.01); *B01D 2255/2092* (2013.01);
(Continued)

(58) Field of Classification Search
CPC .... B01J 35/04; B01D 53/9413; B01D 46/247; B01D 46/2474; B01D 53/9418; B01D 2258/012; B01D 2255/9205; B01D 2255/9155; B01D 2255/504; B01D 2255/2092; B01D 2255/915;
(Continued)

(56) References Cited

U.S. PATENT DOCUMENTS 6,773,481 B2    8/2004   Noguchi et al.
7,842,371 B2    11/2010  Francois et al.
(Continued)

FOREIGN PATENT DOCUMENTS

JP    2002-219319 A    8/2002

*Primary Examiner* — Haytham Soliman
(74) *Attorney, Agent, or Firm* — Burr & Brown, PLLC

(57) ABSTRACT

The honeycomb structure includes a honeycomb structure body having porous partition walls, and a plugging portion disposed in one of open ends of each cell, a thickness of the partition walls is 0.30 mm or more and 0.51 mm or less, a cell density is 30 cells/cm$^2$ or more and 93 cells/cm$^2$ or less, a filtration area (cm$^2$) of inflow cells included per cm$^3$ of the honeycomb structure body is defined as an inflow side filtration area G (cm$^2$/cm$^3$), a value obtained by dividing a pore volume Vp (cm$^3$) formed in the partition walls by a total volume Va (L) including the cells is defined as a pore volume ratio A (cm$^3$/L), and in this case, a product of the inflow side filtration area G (cm$^2$/cm$^3$) and the pore volume ratio A (cm$^3$/L) is 1800 cm$^2$/L or more and 3200 cm$^2$/L or less.

17 Claims, 2 Drawing Sheets

(51) Int. Cl.
  *B01D 46/24* (2006.01)
  *B01D 53/94* (2006.01)
  *F01N 3/20* (2006.01)
  *F01N 3/28* (2006.01)
  *B01J 23/02* (2006.01)

(52) U.S. Cl.
  CPC .............. *B01D 2255/20761* (2013.01); *B01D 2255/50* (2013.01); *B01D 2255/504* (2013.01); *B01D 2255/915* (2013.01); *B01D 2255/9155* (2013.01); *B01D 2255/9205* (2013.01); *B01D 2258/012* (2013.01)

(58) Field of Classification Search
  CPC ...... B01D 2255/20761; B01D 2255/50; F01N 3/2066; F01N 3/2842
  USPC ........................................................ 502/439
  See application file for complete search history.

(56) References Cited

U.S. PATENT DOCUMENTS

| | | | |
|---|---|---|---|
| 7,854,982 B2* | 12/2010 | Kawai | C04B 35/195 428/116 |
| 2003/0041574 A1 | 3/2003 | Noguchi et al. | |
| 2009/0291839 A1* | 11/2009 | Kunieda | B01D 46/2429 502/74 |
| 2010/0222213 A1* | 9/2010 | Ohno | B01D 46/2429 502/332 |
| 2010/0247406 A1* | 9/2010 | Ohno | B01J 35/04 422/222 |
| 2013/0019579 A1* | 1/2013 | Okazaki | B01D 46/2429 55/523 |
| 2015/0033686 A1* | 2/2015 | Shibata | F01N 3/0222 55/482 |

* cited by examiner

HONEYCOMB STRUCTURE

The present application is an application based on JP 2016-064656 filed on Mar. 28, 2016 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is capable of increasing an amount of a catalyst to be loaded and inhibiting increase of pressure loss during use.

Description of the Related Art

In recent years, consciousness for environmental problems has increased in the whole society, and in a technical field in which fuel is burnt to generate power, various technologies have been developed to remove toxic components such as nitrogen oxides from an exhaust gas generated during the burning of the fuel. For example, various technologies have been developed to remove toxic components such as nitrogen oxides from the exhaust gas emitted from a car engine. During such removal of the toxic components in the exhaust gas, it is general to cause chemical reaction in the toxic component by use of a catalyst, thereby changing the component into another comparatively non-toxic component. Further, as a catalyst carrier onto which the catalyst for exhaust gas purification is to be loaded, a honeycomb structure has been used.

Furthermore, the exhaust gas emitted by combustion of an internal combustion engine includes a toxic gas of nitrogen oxides or the like as well as particulate matter such as soot or ash. Hereinafter, the particulate matter will be referred to as "PM" sometimes. For example, regulations on removal of PM emitted from a diesel engine become strict worldwide, and as a filter to remove the PM, a honeycomb filter having a honeycomb structure is used.

Heretofore, as these honeycomb structures, there have been suggested honeycomb structures each including a honeycomb structure body having porous partition walls defining a plurality of cells which extend from an inflow end face to an outflow end face and become through channels for a fluid (e.g., see Patent Documents 1 and 2). In Patent Document 1, there is disclosed a honeycomb structure indicating a predetermined relation between a cell density X and a thickness Y of the partition walls. It is considered that in the honeycomb structure described in Patent Document 1, it is possible to decrease a backpressure and to increase a wash coat loading amount of the catalyst. Furthermore, in Patent Document 2, there is disclosed a porous honeycomb filter made of a material containing cordierite in which a pore distribution is controlled as a main crystal phase.

[Patent Document 1] U.S. Pat. No. 7,842,371
[Patent Document 2] JP-A-2002-219319

SUMMARY OF THE INVENTION

As described in Patent Document 1, it is possible to adjust a backpressure of a honeycomb structure by stipulating a relation between a cell density of the honeycomb structure and a thickness of partition walls. For example, according to a technology described in Patent Document 1, when the partition wall thickness is larger, initial pressure loss is lower in a region where an amount of a catalyst to be loaded is large. Furthermore, when the cell density is larger, the initial pressure is lower in the region where the amount of the catalyst to be loaded is large. However, when the honeycomb structure is actually used as an exhaust gas purifying member, particulate matter such as soot is adhered to surfaces of the partition walls defining through channels for an exhaust gas. Therefore, for the purpose of stipulating the cell density and the partition wall thickness in consideration of the pressure loss of the honeycomb structure, it is necessary to consider a pressure loss increase ratio and the like when the pressure loss increases in the state where the particulate matter is adhered to the surfaces of the partition walls. Further, in the technology described in Patent Document 1, there has been the problem that such a use state of the honeycomb structure as described above is not taken into consideration at all.

Furthermore, in Patent Document 2, a technology of controlling a pore distribution of the honeycomb structure is disclosed, but study is not performed from a structural viewpoint of the honeycomb structure. Consequently, in a porous honeycomb filter described in Patent Document 2, there has been the problem that it is difficult to simultaneously achieve problems to increase the amount of the catalyst to be loaded and to inhibit increase of pressure loss during use because the problems might cause an antinomy relation.

The present invention has been developed in view of the problems of the conventional technologies, and an object thereof is to provide a honeycomb structure which is capable of increasing an amount of a catalyst to be loaded and inhibiting increase of pressure loss during use.

According to the present invention, there is provided a honeycomb structure as follows.

[1] A honeycomb structure including:
a honeycomb structure body having porous partition walls defining a plurality of cells which extend from an inflow end face to an outflow end face and become through channels for a fluid; and
plugging portions disposed in open ends of the cells on the inflow end face side or the outflow end face side,
wherein a thickness of the partition walls is 0.30 mm or more and 0.51 mm or less,
a cell density of the honeycomb structure body is 30 cells/cm$^2$ or more and 93 cells/cm$^2$ or less,
among the cells, the cells in which the plugging portions are disposed in the open ends on the outflow end face side and which are opened on the inflow end face side are defined as inflow cells,
among the cells, the cells in which the plugging portions are disposed in the open ends on the inflow end face side and which are opened on the outflow end face side are defined as outflow cells,
a filtration area (cm$^2$) of the inflow cells included per cm$^3$ of the honeycomb structure body is defined as an inflow side filtration area G (cm$^2$/cm$^3$),
a value obtained by dividing a volume Vp (cm$^3$) of pores formed in the partition walls of the honeycomb structure body by a total volume Va (L) including the cells of the honeycomb structure body is defined as a pore volume ratio A (cm$^3$/L), and
a product of the inflow side filtration area G (cm$^2$/cm$^3$) and the pore volume ratio A (cm$^3$/L) is 1800 cm$^2$/L or more and 3200 cm$^2$/L or less.

[2] The honeycomb structure according to the above [1], wherein the product of the inflow side filtration area G (cm$^2$/cm$^3$) and the pore volume ratio A (cm$^3$/L) is 1800 cm$^2$/L or more and 3000 cm$^2$/L or less.

[3] The honeycomb structure according to the above [2], wherein the product of the inflow side filtration area G ($cm^2/cm^3$) and the pore volume ratio A ($cm^3/L$) is 2000 $cm^2/L$ or more and 3000 $cm^2/L$ or less.

[4] The honeycomb structure according to any one of the above [1] to [3], wherein a mean pore size of the partition walls is from 12 to 20 μm.

[5] The honeycomb structure according to any one of the above [1] to [4], wherein the honeycomb structure body contains cordierite.

[6] The honeycomb structure according to any one of the above [1] to [5], wherein an exhaust gas purifying catalyst is loaded onto at least one of the surface of each partition wall of the honeycomb structure body and each pore of the partition wall.

[7] The honeycomb structure according to the above [6], wherein an amount of the catalyst to be loaded is 50 g/L or more.

[8] The honeycomb structure according to the above [7], wherein the amount of the catalyst to be loaded is 50 g/L or more and 130 g/L or less.

[9] The honeycomb structure according to any one of the above [6] to [8], which is for use in purification of $NO_x$ included in an exhaust gas emitted from a car.

[10] The honeycomb structure according to any one of the above [6] to [9], wherein the catalyst is a catalyst having a selective catalytic reducing function.

A honeycomb structure of the present invention is capable of increasing an amount of a catalyst to be loaded and inhibiting increase of pressure loss during use. In particular, the honeycomb structure of the present invention is characterized in that a thickness of partition walls and a cell density are set to predetermined values, whereas a product of an inflow side filtration area G ($cm^2/cm^3$) and a pore volume ratio A ($cm^3/L$) is set to be 1800 $cm^2/L$ or more and 3200 $cm^2/L$ or less. According to such a constitution, in the honeycomb structure of the present invention, even when a comparatively large amount of catalyst is loaded onto the partition walls, it is possible to effectively decrease pressure loss during use.

DESCRIPTION OF THE PREFERRED EMBODIMENTS

Hereinafter, an embodiment of the present invention will be described. However, the present invention is not limited to the following embodiment. Therefore, it should be understood that changes, improvements and others are suitably addable to the following embodiment on the basis of ordinary knowledge of a person skilled in the art without departing from the gist of the present invention.

Figure 1:
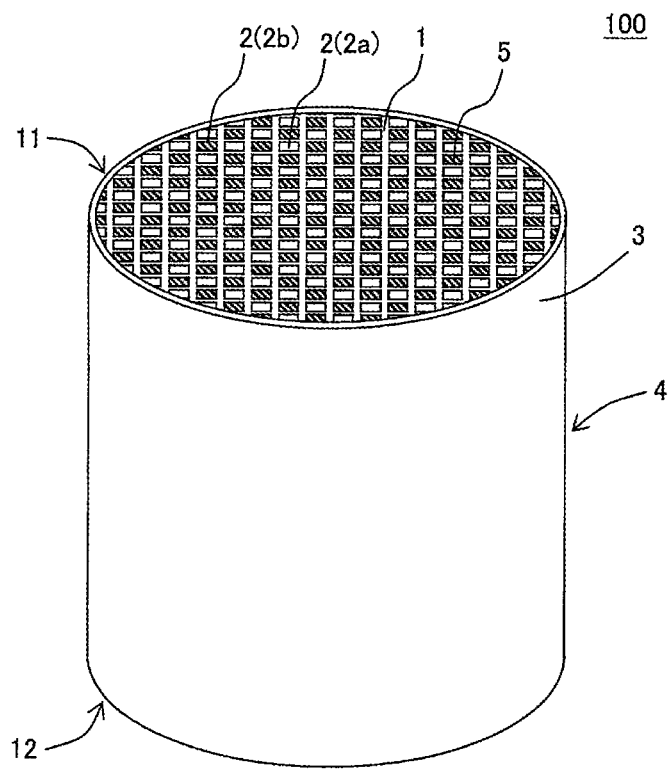
FIG. 1 is a perspective view schematically showing one embodiment of a honeycomb structure of the present invention.
Figure 2:
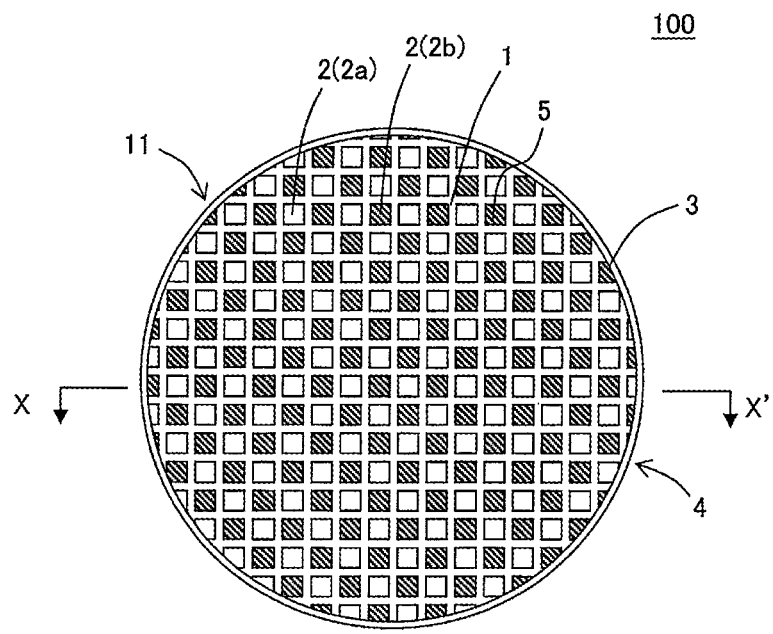
FIG. 2 is a plan view schematically showing an inflow end face of the honeycomb structure shown in FIG. 1.
Figure 3:
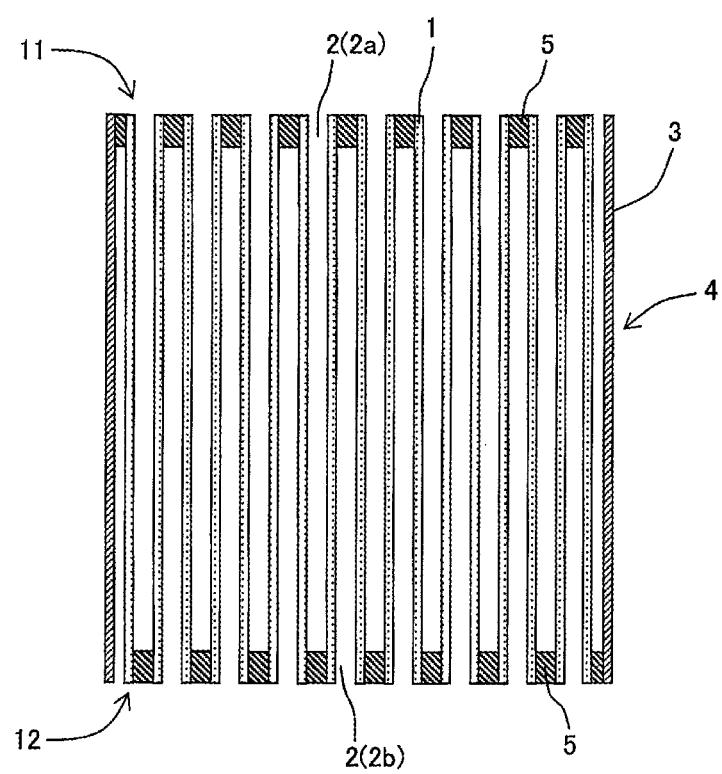
FIG. 3 is a cross-sectional view schematically showing a cross section along the line X-X' of FIG. 2.

(1) Honeycomb Structure:

As shown in FIG. 1 to FIG. 3, one embodiment of a honeycomb structure of the present invention is a honeycomb structure 100 including a honeycomb structure body 4 having porous partition walls 1, and a plugging portion 5 disposed in one of open ends of each cell 2 formed in the honeycomb structure body 4. The porous partition walls 1 define a plurality of cells 2 which extend from an inflow end face 11 to an outflow end face 12 and become through channels for a fluid. The plugging portions 5 are disposed in the open ends of the cells 2 on the side of the inflow end face 11 or the side of the outflow end face 12, to plug one of end portions of each cell 2. Here, among the plurality of cells 2, the cells 2 in which the plugging portions 5 are disposed in the open ends on the outflow end face 12 side and which are opened on the inflow end face 11 side are defined as inflow cells 2a. Furthermore, among the plurality of cells 2, the cells 2 in which the plugging portions 5 are disposed in the open ends on the inflow end face 11 side and which are opened on the outflow end face 12 side are defined as outflow cells 2b.

The honeycomb structure body 4 shown in FIG. 1 to FIG. 3 has a circumferential wall 3 disposed to surround the partition walls 1 which define the cells 2. Here, FIG. 1 is a perspective view schematically showing one embodiment of the honeycomb structure of the present invention. FIG. 2 is a plan view schematically showing the inflow end face of the honeycomb structure shown in FIG. 1. FIG. 3 is a cross-sectional view schematically showing a cross section along the line X-X' of FIG. 2.

The honeycomb structure 100 is characterized by including the honeycomb structure body 4 having the following constitution. First, in the honeycomb structure body 4, a thickness of the partition walls 1 is 0.30 mm or more and 0.51 mm or less. Furthermore, a cell density of the honeycomb structure body 4 is 30 cells/$cm^2$ or more and 93 cells/$cm^2$ or less. Furthermore, in the honeycomb structure body 4, a product of an inflow side filtration area G ($cm^2/cm^3$) and a pore volume ratio A ($cm^3/L$) is 1800 $cm^2/L$ or more and 3200 $cm^2/L$ or less. It is to be noted that in the notation of the inflow side filtration area, the pore volume ratio, or the like, a unit indicated in parentheses is the unit of each value.

Here, the inflow side filtration area G ($cm^2/cm^3$) is a value indicating a filtration area ($cm^2$) of the inflow cells 2a included per unit volume (1 $cm^3$) of the honeycomb structure body 4. The above-mentioned filtration area ($cm^2$) is obtainable by the following method. First, a sample to calculate the inflow side filtration area G ($cm^2/cm^3$) is prepared from the honeycomb structure body 4. This sample is prepared by cutting out a portion from a region of the honeycomb structure body 4 on the inflow end face 11 side. Further, this sample includes 100 or more cells 2 in a cross section of the honeycomb structure body 4, and has a length of 3 cm or more in an extending direction of the cells 2. Next, a cross section of the cut-out sample is observed to measure a peripheral length of the inflow cell 2a. Further, the measured peripheral length (cm) of the inflow cell 2a is multiplied by a length (cm) of the inflow cell 2a in the extending direction of the cells 2, and the filtration area ($cm^2$) of one inflow cell 2a is obtained. In this case, when the plugging portions 5 are disposed on the outflow end face 12 side of the cut-out sample, an area of the surface of the partition wall 1 in which the plugging portion 5 is disposed is also treated as the filtration area of the inflow cell 2a. That is, the plugging portions 5 disposed on the outflow end face 12 side are ignored, thereby obtaining the above-mentioned filtration area ($cm^2$) of the inflow cell 2a. In this way, the filtration areas ($cm^2$) of all the inflow cells 2a formed in the cut-out sample are obtained, and a total sum of the filtration areas is obtained as the above-mentioned "filtration area ($cm^2$) of the inflow cells 2a". For example, in a case where shapes of all the inflow cells 2a are the same, it is possible to obtain the filtration area ($cm^2$) of the inflow cells 2a by "the peripheral length (cm) of the inflow cell 2a×the length (cm) of the inflow cell $2a$×the number (cells) of the inflow cells $2a$". The peripheral length (cm) of the inflow cell $2a$ is a value measured with an optical microscope. A value obtained by dividing the obtained "filtration area (cm²) of the inflow cells $2a$" by a volume (cm³) of the sample cut out from the honeycomb structure body 4 is the inflow side filtration area G (cm²/cm³). The volume (cm³) of the sample is obtainable by multiplying a sectional area (cm²) of the sample by the length (cm) of the sample in the extending direction of the cells 2.

The pore volume ratio A (cm³/L) is a value obtained by dividing a pore volume Vp (cm³) formed in the partition walls 1 of the honeycomb structure body 4 by a total volume Va (L) including the cells 2 of the honeycomb structure body 4. The pore volume Vp (cm³) formed in the partition walls 1 of the honeycomb structure body 4 is obtainable by multiplying a porosity (%) of the honeycomb structure body 4 by a volume (cm³) of the partition walls 1 of the honeycomb structure body 4. It is to be noted that the porosity (%) of the honeycomb structure body 4 is a value measured with a mercury porosimeter. An example of the mercury porosimeter is Autopore 9500 (tradename) manufactured by Micromeritics Instrument Corporation. The total volume Va (L) including the cells 2 of the honeycomb structure body 4 is obtainable by multiplying an area of the cross section of the honeycomb structure body 4 which is perpendicular to the cell extending direction by a length of the honeycomb structure body 4 in the extending direction of the cells 2.

In the honeycomb structure 100 of the present embodiment, a pressure loss increase ratio is low, and hence it is possible to increase an amount of a catalyst to be loaded onto the partition walls 1 and to inhibit increase of pressure loss during use. Therefore, in the honeycomb structure 100 of the present embodiment, even when a comparatively large amount of the catalyst is loaded onto the partition walls 1, it is possible to effectively decrease the pressure loss during the use. For the purpose of producing such effects, it is important that three requirements, i.e., the above-mentioned "thickness of the partition walls 1", "cell density" and "product of the inflow side filtration area G (cm²/cm³) and the pore volume ratio A (cm³/L)" satisfy the above-mentioned numeric ranges.

When the thickness of the partition walls is smaller than 0.30 mm, the pressure loss increase ratio remarkably increases in a case where particulate matter such as soot is adhered to the surfaces of the partition walls. Therefore, when the thickness of the partition walls is smaller than 0.30 mm, the pressure loss during the use might increase. Furthermore, when the thickness of the partition walls is smaller than 0.30 mm, an isostatic strength of the honeycomb structure body might decrease. On the other hand, when the thickness of the partition walls is in excess of 0.51 mm, the thickness of the partition walls is so large that the pressure loss during the use might increase. The thickness of the partition walls is from 0.30 to 0.51 mm, preferably from 0.30 to 0.46 mm and especially preferably from 0.30 to 0.41 mm.

When the cell density is smaller than 30 cells/cm², the pores might be clogged with the loaded catalyst, thereby increasing the pressure loss increase ratio during the use. On the other hand, when the cell density is in excess of 93 cells/cm², due to the large cell density, clogging of the cells with the catalyst and clogging of the cells with the soot after the catalyst is loaded might occur to increase the pressure loss increase ratio. The cell density is from 30 to 93 cells/cm², preferably from 30 to 78 cells/cm² and especially preferably from 30 to 62 cells/cm².

When the product of the inflow side filtration area G (cm²/cm³) and the pore volume ratio A (cm³/L) is smaller than 1800 cm²/L, the pressure loss increase ratio remarkably increases in a case where particulate matter such as the soot is adhered to the surfaces of the partition walls. Therefore, the pressure loss during the use might increase. On the other hand, when the product of the inflow side filtration area G (cm²/cm³) and the pore volume ratio A (cm³/L) is in excess of 3200 cm²/L, the isostatic strength runs short and practical obstruction occurs in a case where a porosity of cordierite also increases.

When the product of the inflow side filtration area G (cm²/cm³) and the pore volume ratio A (cm³/L) is preferably 1800 cm²/L or more and 3200 cm²/L or less and especially preferably 2000 cm²/L or more and 3000 cm²/L or less.

The porosity (%) of the honeycomb structure body is a parameter for use in obtaining the pore volume ratio A (cm³/L), and a suitable value of the porosity (%) is as follows. The porosity (%) of the honeycomb structure body is preferably from 40 to 80%, further preferably from 40 to 75% and especially preferably from 45 to 75%.

A mean pore size of the partition walls is preferably from 12 to 20 μm, more preferably from 13 to 20 μm, and especially preferably from 14 to 20 μm. When the mean pore size is smaller than 12 μm, catalyst particles do not enter the pores in the partition walls and are therefore deposited on the surfaces of the partition walls, thereby unfavorably increasing the pressure loss increase ratio when a gas passes through the cells. On the other hand, when the mean pore size is in excess of 20 μm and when the porosity is constant but pore sizes increase, the number of the pores formed in the partition walls decreases. Consequently, a flow rate of the gas passing through the pores increases, and hence the pressure loss increase ratio when the gas permeates the partition walls unfavorably increases. The mean pore size of the partition walls is a value measured with the mercury porosimeter in the same manner as in the porosity.

There is not any special restriction on a material of the honeycomb structure body. An example of the material of the honeycomb structure body is ceramic. Especially in the honeycomb structure of the present embodiment, it is preferable that the honeycomb structure body contains silicon carbide, silicon-bonded silicon carbide, a bonding material-sintered ceramics material, mullite, cordierite, or aluminum titanate. Especially, the honeycomb structure body more preferably contains cordierite. Additionally, in "silicon-bonded silicon carbide", for example, silicon carbide particles as aggregates are bonded by metal silicon. Furthermore, in "the bonding material-sintered ceramics material", for example, aggregates of silicon carbide, mullite or the like are bonded by a bonding material of cordierite or the like, and sintered to prepare the ceramics material. Further, a constituent component of the honeycomb structure body further preferably contains 20 mass % or more of silicon carbide, cordierite or aluminum titanate and especially preferably contains 50 mass % or more of silicon carbide, cordierite or aluminum titanate. Furthermore, each ceramic component may be oriented, non-oriented or a crystal phase. A content ratio (mass %) of the constituent component in the honeycomb structure body is measurable by, for example, an X-ray diffraction method, or a fluorescent X-ray element analysis method.

There is not any special restriction on a shape of the cells formed in the honeycomb structure body. Examples of the cell shape in the cross section perpendicular to the cell extending direction include a polygonal shape, a round shape and an elliptic shape. Examples of the polygonal shape include a triangular shape, a quadrangular shape, a pentangular shape, a hexagonal shape, and an octagonal shape. Furthermore, the shape of the inflow cells may be different from the shape of the outflow cells. For example, the shape of the inflow cells may be octagonal and the shape of the outflow cells may be quadrangular. Furthermore, as to a size of the cells, all the cells may have the same size or different sizes. For example, among the plurality of cells, the size of the inflow cells may increase and the size of the outflow cells may relatively decrease as compared with the size of the inflow cells. Furthermore, conversely, among the plurality of cells, the size of the inflow cells may decrease and the size of the outflow cells may relatively increase as compared with the size of the inflow cells. Furthermore, also in the inflow cells, the cells having different sizes may be mixed. Also in the outflow cells, the cells having different sizes may be mixed.

There is not any special restriction on a shape of the honeycomb structure body. As the shape of the honeycomb structure body, examples of a shape of the inflow end face and the outflow end face include round, elliptic, and polygonal pillar shapes. For example, in a case where the shape of the inflow end face and outflow end face is round, the shape of the honeycomb structure body is a round pillar shape. Examples of the polygonal shape include a quadrangular shape, a pentangular shape, a hexagonal shape, a heptagonal shape, and an octagonal shape.

There is not any special restriction on a size of the honeycomb structure body, e.g., a length from the inflow end face to the outflow end face, and a size of the cross section of the honeycomb structure body which is perpendicular to the cell extending direction. When the honeycomb structure of the present embodiment is used as an exhaust gas purifying member, each size may suitably be selected to obtain an optimum purifying performance. For example, the length of the honeycomb structure body from the inflow end face to the outflow end face is preferably from 80 to 400 mm, further preferably from 100 to 380 mm, and especially preferably from 150 to 360 mm. Furthermore, an area of the cross section of the honeycomb structure body which is perpendicular to the cell extending direction is preferably from 7000 to 130000 mm$^2$, further preferably from 10000 to 120000 mm$^2$, and especially preferably from 16000 to 100000 mm$^2$.

The plugging portions are disposed in open ends of predetermined cells on an inflow end face side and open ends of the residual cells other than the predetermined cells on an outflow end face side among the plurality of cells. As described above, as to the plurality of cells, one of the open ends of each cell is plugged with the plugging portion, so that the honeycomb structure of the present embodiment is utilizable as an exhaust gas purifying filter. Especially, the honeycomb structure of the present embodiment is usable in purification of NO included in an exhaust gas emitted from a car. It is to be noted that the cells in which the plugging portions are disposed in the open ends on the outflow end face side and which are opened on the inflow end face side are referred to as the inflow cells. The cells in which the plugging portions are disposed in the open ends on the inflow end face side and which are opened on the outflow end face side are referred to as the outflow cells.

There is not any special restriction on arrangement of the inflow cells and the outflow cells in the honeycomb structure body, but it is preferable to arrange the cells so that one inflow cell is adjacent to at least one outflow cell via the partition wall. For example, in a case where the cell shape is quadrangular, it is preferable that the inflow cells and the outflow cells are alternately arranged via the partition walls and that both end faces of the honeycomb structure body possess complementary checkerboard patterns.

In the honeycomb structure of the present embodiment, an exhaust gas purifying catalyst may be loaded onto at least one of the surface of each partition wall of the honeycomb structure body and each pore of the partition wall. According to this constitution, CO, $NO_x$, HC and the like in the exhaust gas can be changed to non-toxic substances by a catalytic reaction. A preferable example of the catalyst is a catalyst containing at least one selected from the group consisting of a noble metal, aluminum, nickel, zirconium, titanium, cerium, cobalt, manganese, zinc, copper, tin, iron, niobium, magnesium, lanthanum, samarium, bismuth and barium. Examples of the noble metal include platinum, rhodium, palladium, ruthenium, indium, silver and gold. The above element may be contained as a metal simple substance, a metal oxide or another metal compound. In the honeycomb structure of the present embodiment, the above catalyst is more preferably a catalyst having a selective catalytic reducing function. An example of the catalyst having the selective catalytic reducing function is a metal-substituted zeolite. Examples of a metal in the metal-substituted zeolite include iron, copper, hafnium, lanthanum, gold, indium, vanadium, lanthanoid, and transition metals of groups 8 to 10. It is to be noted that the group numbers of a periodic table described in the present specification conform to indication of group numbers 1 to 18 in a revision of inorganic chemistry nomenclature by International Union of Pure and Applied Chemistry (IUPAC) in 1989. The zeolite may be natural or artificial, and suitable examples of the zeolite include A-type zeolite, Y-type zeolite, mordenite, ZSM-5, USY, DDR, CHA, and beta zeolite. Furthermore, the catalyst having the selective catalytic reducing function may be a catalyst containing, as a main component, at least one selected from the group consisting of vanadium and titania. A content of vanadium or titania in the catalyst having the selective catalytic reducing function is preferably 60 mass % or more.

The amount of the catalyst to be loaded is preferably 50 g/L or more, further preferably 50 g/L or more and 130 g/L or less, and especially preferably 50 g/L or more and 80 g/L or less. When the amount of the catalyst to be loaded is smaller than 50 g/L, a catalytic operation does not sufficiently develop. When the amount of the catalyst to be loaded is in excess of 130 g/L, due to the loading of the catalyst, the pressure loss increase ratio might increase, and manufacturing cost of the honeycomb structure might increase. It is to be noted that the amount of the catalyst to be loaded is a mass (g) of the catalyst to be loaded per liter of the honeycomb structure. An example of a catalyst loading method is a method of wash-coating the partition walls with a catalyst solution containing a catalyst component, and then performing a heat treatment at a high temperature to bake the honeycomb structure.

There is not any special restriction on a manufacturing method of the honeycomb structure of the present embodiment, and the honeycomb structure can be manufactured by, for example, the following method. First, a plastic kneaded material to prepare the honeycomb structure body is prepared. The kneaded material to prepare the honeycomb structure body can be prepared by suitably adding an additive such as a binder, and water to a material selected as raw material powder from the above-mentioned suitable materials of the partition walls.

Next, the prepared kneaded material is extruded, thereby obtaining a pillar-shaped honeycomb formed body having partition walls defining a plurality of cells and a circumferential wall disposed at an outermost circumference. In the extrusion, it is preferable to use a die having desirable cell shape, partition wall thickness and cell density as an extruding die.

The obtained honeycomb formed body is dried with, for example, microwaves and hot air, and open ends of the cells are plugged with a material similar to the material used in manufacturing the honeycomb formed body, thereby arranging plugging portions. The honeycomb formed body may further be dried after the plugging portions are arranged.

Next, the honeycomb formed body in which the plugging portions are arranged is fired, thereby obtaining the honeycomb structure. A firing temperature and a firing atmosphere vary with a raw material, and a person skilled in the art can select the firing temperature and firing atmosphere suitable for the selected material.

Furthermore, the catalyst may be loaded onto the obtained honeycomb structure. There is not any special restriction on a method of loading the catalyst, but an example of the method is a method of wash-coating the partition walls of the honeycomb structure with the catalyst solution containing the catalyst component and then performing the heat treatment at the high temperature to bake the honeycomb structure.

EXAMPLES

Example 1

20 parts by mass of pore former, 30 parts by mass of dispersing medium, 5 parts by mass of organic binder and 0.5 parts by mass of dispersing agent were added to 100 parts by mass of cordierite forming raw material, and mixed and kneaded to prepare a kneaded material. As the cordierite forming raw material, there were used alumina, aluminum hydroxide, kaolin, talc, and silica. Water was used as the dispersing medium, a foamable resin having an average particle diameter of 30 µm was used as a pore former, hydroxypropyl methylcellulose was used as the organic binder, and a surfactant was used as the dispersing agent.

Next, the kneaded material was extruded by using a honeycomb formed body preparing die, to obtain a honeycomb formed body having a round pillar shape as a whole. A cell shape of the honeycomb formed body was quadrangular.

Next, the honeycomb formed body was dried with a microwave drier, and further completely dried with a hot air dryer, and both end faces of the honeycomb formed body were cut to adjust the honeycomb formed body into a predetermined dimension.

Next, a film was attached to cover the whole region of one end face of the honeycomb formed body, and pierced portions were opened in regions of the film which corresponded to open ends of the cells which became outflow cells. Next, an end portion of the honeycomb formed body to which the film was attached was immersed into a slurried plugging material containing the cordierite forming raw material, thereby charging the plugging material into the open ends of the cells which became the outflow cells. The one end face of the honeycomb formed body was defined as an inflow end face in a finally obtained honeycomb structure.

Next, a film was attached to cover the whole region of the other end face of the honeycomb formed body, and pierced portions were opened in regions of the film which corresponded to open ends of the cells which became inflow cells. Next, an end portion of the honeycomb formed body to which the film was attached was immersed into the slurried plugging material containing the cordierite forming raw material, thereby charging the plugging material into the open ends of the cells which became the inflow cells. The other end face of the honeycomb formed body was defined as an outflow end face in the finally obtained honeycomb structure.

Next, the honeycomb formed body in which the plugging material was charged into the open ends of the respective cells was degreased and fired to manufacture the honeycomb structure of Example 1. The honeycomb structure included a honeycomb structure body having porous partition walls and plugging portions formed by the plugging material. In the honeycomb structure of Example 1, the inflow cells and the outflow cells were alternately arranged via the partition walls. That is, the honeycomb structure of Example 1 is a honeycomb filter in which one end portion of each cell is sealed with the plugging portion.

In the honeycomb structure of Example 1, a partition wall thickness was 0.36 mm and a cell density was 31 cells/cm$^2$. A cell shape was quadrangular. A porosity of the partition walls was 65% and a mean pore size of the partition walls was 19 µm. The porosity and mean pore size of the partition walls are values measured with a mercury porosimeter (Autopore 9500 (tradename) manufactured by Micromeritics Instrument Corporation). Table 1 shows the porosity of the partition walls, the cell density and the cell shape in columns of "partition wall thickness", "cell density" and "cell shape" which are columns of a cell structure. It is to be noted that the cell shape is a shape of cells in a cross section perpendicular to a cell extending direction. Furthermore, Table 1 shows values of the porosity and mean pore size of the partition walls in columns of "porosity" and "mean pore size" which are columns of pore characteristics.

The honeycomb structure of Example 1 had a round pillar shape in which a shape of an inflow end face and an outflow end face was round. A size of a diameter of each of the inflow end face and the outflow end face was 266.7 mm. Furthermore, a length of the honeycomb structure in the cell extending direction was 304.8 mm. Table 1 shows the shape of the inflow end face and outflow end face of the honeycomb structure in a column of "sectional shape" among columns of the shape of the honeycomb structure. Table 1 shows the size of the diameter of each of the inflow end face and the outflow end face of the honeycomb structure in a column of "diameter" among the columns of the shape of the honeycomb structure. Table 1 shows the length of the honeycomb structure in the cell extending direction in a column of "total length" among the columns of the shape of the honeycomb structure. It is to be noted that Table 1 shows values of a long diameter and a short diameter of an elliptic shape in columns of "long diameter" and "short diameter" among the columns of the shape of the honeycomb structure in a case where the shape of the inflow end face and outflow end face of the honeycomb structure is elliptic.

An inflow side filtration area G (cm$^2$/cm$^3$) of the honeycomb structure of Example 1 was obtained by the following method. First, a filtration area (cm$^2$) of inflow cells was obtained by a peripheral length (cm) of each inflow cell×a length (cm) of the inflow cell×the number (cells) of the inflow cells. The obtained "filtration area (cm$^2$) of the inflow cells" was divided by a volume (cm$^3$) of the honeycomb structure body, to obtain the filtration area (cm$^2$) of the inflow cells 2a included per cm$^3$ of a honeycomb structure body 4. This value is the inflow side filtration area G (cm$^2$/cm$^3$). In the honeycomb structure of Example 1, the inflow side filtration area G was 8.9 cm$^2$/cm$^3$. Table 2 shows the value of the inflow side filtration area G ($cm^2/cm^3$) in a column of "inflow side filtration area G".

Furthermore, a pore volume ratio A ($cm^3/L$) of the honeycomb structure of Example 1 was obtained by the following method. First, a pore volume Vp ($cm^3$) formed in the partition walls of the honeycomb structure body was obtained by multiplying a porosity (%) of the honeycomb structure body by a volume ($cm^3$) of the partition walls of the honeycomb structure body. Next, the obtained pore volume Vp ($cm^3$) was divided by a total volume Va (L) including the cells of the honeycomb structure body to obtain the pore volume ratio A ($cm^3/L$). In the honeycomb structure of Example 1, the pore volume ratio A was 221 $cm^3/L$. Table 2 shows the value of the pore volume ratio A ($cm^3/L$) in a column of "pore volume ratio A".

Furthermore, as to the honeycomb structure of Example 1, a value was obtained by multiplying the inflow side filtration area G ($cm^2/cm^3$) by the pore volume ratio A ($cm^3/L$). The value obtained by multiplying the inflow side filtration area G ($cm^2/cm^3$) by the pore volume ratio A ($cm^3/L$) was 1966 $cm^2/L$. Table 2 shows a value obtained by multiplying the inflow side filtration area G ($cm^2/cm^3$) by the pore volume ratio A ($cm^3/L$) in a column of "G×A". Furthermore, an area of the cross section of the honeycomb structure body which was perpendicular to the cell extending direction was obtained. Table 2 shows the area of the cross section of the honeycomb structure body which is perpendicular to the cell extending direction in a column of "a sectional area perpendicular to a cell direction". In Example 1, "the sectional area perpendicular to the cell direction" was 559.9 $cm^2$.

As an SCR catalyst, a Cu-substituted zeolite catalyst was loaded onto the honeycomb structure of Example 1. Here, "SCR" is an abbreviation for selective catalytic reduction. The SCR catalyst means a catalyst having a selective catalytic reducing function. The above-mentioned SCR catalyst was loaded onto the honeycomb structure by a method of sucking a catalyst slurry. Specifically, water was first added to adjust a viscosity of a slurry including the SCR catalyst into 8 Pa·s. Next, an end portion of the honeycomb structure on an outflow end face side was immersed into a container in which the catalyst slurry was contained, and the catalyst slurry in the container was sucked from an end portion side on the inflow end face side. Afterward, the honeycomb structure to which the catalyst slurry was adhered was dried with hot air at 500° C. for 2 hours, to prepare the honeycomb structure onto which the catalyst was loaded. An amount of the catalyst to be loaded was set to 75 g/L. Table 2 shows the amount (g/L) of the catalyst to be loaded in a column of "amount of catalyst to be loaded".

TABLE 1

| | Cell structure | | | Pore characteristics | | Shape of honeycomb structure | | | | |
|---|---|---|---|---|---|---|---|---|---|---|
| | Partition wall thickness [mm] | Cell density [cells/$cm^2$] | Cell shape | Porosity [%] | Mean pore size [μm] | Sectional shape | Dia. [mm] | Long dia. [mm] | Short dia. [mm] | Total length [mm] |
| Example 1 | 0.36 | 31 | Quadrangular | 65 | 19 | Round | 267 | — | — | 305 |
| Example 2 | 0.41 | 31 | Quadrangular | 60 | 20 | Round | 267 | — | — | 305 |
| Example 3 | 0.30 | 46.5 | Quadrangular/octagonal | 63 | 16 | Round | 144 | — | — | 152 |
| Example 4 | 0.30 | 46.5 | Quadrangular/octagonal | 67 | 18 | Round | 356 | — | — | 203 |
| Example 5 | 0.30 | 46.5 | Quadrangular | 70 | 25 | Round | 191 | — | — | 356 |
| Example 6 | 0.30 | 46.5 | Quadrangular | 62 | 16 | Elliptic | — | 304 | 200 | 300 |
| Example 7 | 0.36 | 31 | Quadrangular | 63 | 20 | Round | 144 | — | — | 254 |
| Example 8 | 0.30 | 93 | Quadrangular | 48 | 20 | Round | 267 | — | — | 254 |
| Example 9 | 0.46 | 31 | Quadrangular | 55 | 15 | Round | 305 | — | — | 254 |
| Example 10 | 0.30 | 62 | Quadrangular | 60 | 18 | Round | 144 | — | — | 178 |
| Example 11 | 0.36 | 31 | Quadrangular | 65 | 18 | Round | 172 | — | — | 203 |
| Example 12 | 0.41 | 31 | Quadrangular | 67 | 20 | Round | 191 | — | — | 203 |
| Example 13 | 0.30 | 46.5 | Hexagonal | 65 | 17 | Round | 267 | — | — | 305 |
| Example 14 | 0.30 | 46.5 | Quadrangular/octagonal | 75 | 24 | Round | 356 | — | — | 203 |
| Example 15 | 0.35 | 31 | Quadrangular | 65 | 21 | Round | 267 | — | — | 305 |
| Example 16 | 0.30 | 46.5 | Quadrangular/octagonal | 63 | 16 | Round | 144 | — | — | 152 |
| Example 17 | 0.30 | 46.5 | Quadrangular/octagonal | 67 | 18 | Round | 356 | — | — | 203 |
| Example 18 | 0.36 | 31 | Quadrangular | 63 | 20 | Round | 144 | — | — | 254 |
| Example 19 | 0.30 | 93 | Quadrangular | 48 | 20 | Round | 267 | — | — | 254 |
| Example 20 | 0.36 | 31 | Quadrangular | 65 | 18 | Round | 172 | — | — | 203 |
| Example 21 | 0.41 | 31 | Quadrangular | 67 | 20 | Round | 191 | — | — | 203 |
| Example 22 | 0.30 | 46.5 | Quadrangular | 75 | 24 | Round | 356 | — | — | 203 |
| Example 23 | 0.30 | 46.5 | Quadrangular | 67 | 18 | Round | 356 | — | — | 203 |

TABLE 2

| | Partition wall thickness [mm] | Cell density [cells/cm$^2$] | Sectional area perpendicular to cell direction [cm$^2$] | Inflow side filtration area G [cm$^2$/cm$^3$] | Pore volume Vp [cm$^3$] | Total volume Va [L] | Pore volume ratio A [cm$^3$/L] | G × A [cm$^2$/L] | Amount of catalyst to be loaded [g/L] |
|---|---|---|---|---|---|---|---|---|---|
| Example 1 | 0.36 | 31 | 559.9 | 8.9 | 3773 | 17.1 | 221 | 1966 | 75 |
| Example 2 | 0.41 | 31 | 559.9 | 8.6 | 3918 | 17.1 | 229 | 1973 | 75 |
| Example 3 | 0.30 | 46.5 | 162.9 | 11.9 | 518 | 2.5 | 209 | 2490 | 75 |
| Example 4 | 0.30 | 46.5 | 995.4 | 11.9 | 4732 | 20.2 | 234 | 2787 | 75 |
| Example 5 | 0.30 | 46.5 | 286.5 | 10.8 | 2479 | 10.2 | 243 | 2625 | 75 |
| Example 6 | 0.30 | 46.5 | 500.0 | 10.8 | 3255 | 15.0 | 217 | 2344 | 75 |
| Example 7 | 0.36 | 31 | 162.9 | 8.9 | 851 | 4.1 | 206 | 1831 | 75 |
| Example 8 | 0.30 | 93 | 559.9 | 12.0 | 3262 | 14.2 | 229 | 2753 | 75 |
| Example 9 | 0.46 | 31 | 730.6 | 8.3 | 4353 | 18.6 | 235 | 1947 | 75 |
| Example 10 | 0.30 | 62 | 162.9 | 12.0 | 672 | 2.9 | 232 | 2782 | 75 |
| Example 11 | 0.36 | 31 | 232.3 | 8.9 | 1020 | 4.7 | 216 | 1925 | 75 |
| Example 12 | 0.41 | 31 | 286.5 | 8.6 | 1461 | 5.8 | 251 | 2160 | 75 |
| Example 13 | 0.30 | 46.5 | 559.9 | 10.2 | 3939 | 17.1 | 231 | 2353 | 75 |
| Example 14 | 0.30 | 46.5 | 995.4 | 11.9 | 5297 | 20.2 | 262 | 3120 | 75 |
| Example 15 | 0.36 | 31 | 559.9 | 8.9 | 3773 | 17.1 | 221 | 1966 | 50 |
| Example 16 | 0.30 | 46.5 | 162.9 | 11.9 | 518 | 2.5 | 209 | 2490 | 50 |
| Example 17 | 0.30 | 46.5 | 995.4 | 11.9 | 4732 | 20.2 | 234 | 2787 | 50 |
| Example 18 | 0.36 | 31 | 162.9 | 8.9 | 851 | 4.1 | 206 | 1831 | 50 |
| Example 19 | 0.30 | 93 | 559.9 | 12.0 | 3262 | 14.2 | 229 | 2753 | 50 |
| Example 20 | 0.36 | 31 | 232.3 | 8.9 | 1020 | 4.7 | 216 | 1925 | 50 |
| Example 21 | 0.41 | 31 | 286.5 | 8.6 | 1461 | 5.8 | 251 | 2160 | 50 |
| Example 22 | 0.30 | 46.5 | 995.4 | 10.9 | 5369 | 20.2 | 266 | 2896 | 50 |
| Example 23 | 0.30 | 46.5 | 995.4 | 10.9 | 4796 | 20.2 | 237 | 2587 | 130 |

Furthermore, as to the honeycomb structure of Example 1, an evaluation of a pressure loss increase ratio and an evaluation of an isostatic strength were carried out by the following methods. Table 3 shows the result.

(Pressure Loss Increase Ratio)

First, a PM-containing gas was generated by using a PM generating device described in JP-A-2007-155708. Additionally, light oil was used as fuel of the PM generating device. The PM-containing gas generated from this PM generating device was introduced from an inflow end face side of the honeycomb structure onto which a catalyst was not loaded, to deposit soot on surfaces of partition walls of the honeycomb structure. Further, at 200° C. in a state of a PM-containing gas flow rate of 10 Nm$^3$/min, there was obtained a pressure difference between an inflow end face and an outflow end face during deposition of soot in an amount of 3 g/L. The pressure difference obtained in this manner was defined as "a pressure loss value with the soot on the honeycomb structure without the catalyst". Table 3 shows the value in a column of "pressure loss (kPa) without catalyst". Furthermore, separately, soot was deposited in an amount of 3 g/L on the honeycomb structure onto which the catalyst was loaded in a value of an amount shown in Table 2, and similarly at 200° C. in the state of the flow rate of 10 Nm$^3$/min, the pressure difference between the inflow end face and the outflow end face was obtained. The pressure difference obtained in this manner was defined as "a pressure loss value with the soot on the honeycomb structure with the catalyst". Table 3 shows a column of "pressure loss (kPa) with catalyst". Further, a value of "the pressure loss value with the soot on the honeycomb structure with the catalyst"/"the pressure loss value with the soot on the honeycomb structure without the catalyst" was obtained, and the value was defined as an evaluation value of the pressure loss increase ratio. Table 3 shows a column of "pressure loss increase ratio evaluation value". The smaller the obtained evaluation value of the pressure loss increase ratio is, the more the increase of the pressure loss is inhibited when the soot is deposited on the honeycomb structure with the catalyst. In Table 3, evaluations of A to C were carried out on the basis of the evaluation value of the pressure loss increase ratio. The evaluation result of A indicates that the evaluation value of the pressure loss increase ratio is 3.0 or less and the example is most excellent. The evaluation result of B indicates that the value is larger than 3.0 and 3.5 or less, and the result is poorer than the evaluation of A, but is a suitable result. The evaluation result of C indicates that the evaluation value of the pressure loss increase ratio is larger than 3.5 and hence the example is not suitable for practical use.

(Isostatic Strength)

An isostatic strength was measured on the basis of an isostatic breaking strength test stipulated in a car standard (JASO Standard) M505-87 issued by the society of Automotive Engineers of Japan. The isostatic breaking strength test is a test of placing the honeycomb structure in a tubular container of rubber and closing the container with a lid made of an aluminum plate to perform isotropic pressurizing compression in water. That is, the isostatic breaking strength test is a test which simulates compressive load addition in a case of holding a circumferential surface of the honeycomb structure in a can member. The isostatic strength measured by this isostatic breaking strength test is indicated by an adding pressure value (MPa) when the honeycomb structure breaks. In accordance with the following evaluation standards, the isostatic strength was evaluated. In the evaluation result of A, the honeycomb structure has an isostatic strength of 2.0 MPa or more and satisfies a practical level for use of the honeycomb structure as an exhaust gas purifying member. In the evaluation result of B, the honeycomb structure has an isostatic strength of 1.0 to 2.0 MPa, and the result is poorer than the evaluation result of A, but is a suitable result. On the other hand, in the evaluation result of C, the isostatic strength is smaller than 1 MPa, and the honeycomb structure is not suitable for use of the honeycomb structure as the exhaust gas purifying member.

TABLE 3

|  | Pressure loss without catalyst [KPa] | Pressure loss with catalyst [KPa] | Pressure loss increase ratio evaluation value | Judgment | Isostatic strength MPa | Judgment |
|---|---|---|---|---|---|---|
| Example 1 | 4.5 | 14.2 | 3.2 | B | 1.7 | B |
| Example 2 | 5.0 | 15.0 | 3.0 | A | 2.3 | A |
| Example 3 | 21.4 | 58.1 | 2.7 | A | 1.8 | B |
| Example 4 | 2.4 | 5.3 | 2.2 | A | 1.5 | B |
| Example 5 | 8.1 | 17.5 | 2.2 | A | 1.4 | B |
| Example 6 | 6.6 | 18.8 | 2.8 | A | 1.9 | B |
| Example 7 | 18.6 | 64.0 | 3.4 | B | 1.4 | B |
| Example 8 | 7.1 | 16.9 | 2.4 | A | 3.1 | A |
| Example 9 | 5.7 | 17.7 | 3.1 | B | 3.0 | A |
| Example 10 | 19.6 | 44.8 | 2.3 | A | 2.8 | A |
| Example 11 | 14.5 | 47.1 | 3.3 | B | 1.8 | B |
| Example 12 | 12.9 | 36.3 | 2.8 | A | 2.6 | A |
| Example 13 | 4.0 | 10.4 | 2.6 | A | 1.7 | B |
| Example 14 | 2.3 | 4.3 | 1.9 | A | 1.2 | B |
| Example 15 | 4.7 | 13.2 | 2.8 | B | 1.6 | B |
| Example 16 | 18.2 | 36.3 | 2.0 | A | 1.6 | B |
| Example 17 | 2.4 | 3.8 | 1.6 | A | 1.7 | B |
| Example 18 | 19.2 | 55.7 | 2.9 | B | 1.7 | B |
| Example 19 | 7.1 | 12.1 | 1.7 | A | 2.8 | A |
| Example 20 | 14.5 | 40.5 | 2.8 | B | 1.8 | B |
| Example 21 | 12.9 | 37.2 | 2.9 | A | 2.1 | A |
| Example 22 | 2.3 | 4.2 | 1.9 | A | 1.2 | B |
| Example 23 | 2.4 | 8.2 | 3.4 | B | 1.6 | B |

Examples 2 to 23

The procedure of Example 1 was repeated except that a cell structure of a honeycomb structure, pore characteristics and a shape of the honeycomb structure were changed as shown in Table 1, to prepare honeycomb structures. In Examples 2 to 23, a porosity was adjusted in accordance with an amount of a foamable resin and an amount of an organic binder. Furthermore, in Examples 2 to 23, a mean pore size was adjusted in accordance with particle diameters of the foamable resin, particle diameters of a cordierite forming raw material and a firing temperature. Furthermore, when Table 1 shows "quadrangular and octagonal" in a column of "cell shape" among columns of the cell structure, it is indicated that a shape of inflow cells is octagonal and a shape of outflow cells is quadrangular.

Comparative Examples 1 to 12

The procedure of Example 1 was repeated except that a cell structure of a honeycomb structure, pore characteristics and a shape of the honeycomb structure were changed as shown in Table 4, to prepare honeycomb structures.

As to the honeycomb structures of Examples 2 to 23 and Comparative Examples 1 to 12, there were obtained an inflow side filtration area G (cm$^2$/cm$^3$), a pore volume ratio A (cm$^3$/L), and a value of the inflow side filtration area G (cm$^2$/cm$^3$) multiplied by the pore volume ratio A (cm$^3$/L). Table 2 or Table 5 shows each value. Furthermore, as to the honeycomb structures of Examples 2 to 23 and Comparative Examples 1 to 12, the procedure of Example 1 was repeated to carry out an evaluation of a pressure loss increase ratio and an evaluation of an isostatic strength. Table 3 and Table 6 show the results.

TABLE 4

|  | Cell structure | | | Pore characteristics | | | Shape of honeycomb structure | | | |
|---|---|---|---|---|---|---|---|---|---|---|
|  | Partition wall thickness [mm] | Cell density [cells/cm$^2$] | Cell shape | Porosity [%] | Mean pore size [μm] | Sectional shape | Dia. [mm] | Long dia. [mm] | Short dia. [mm] | Total length [mm] |
| Comparative Example 1 | 0.25 | 31 | Quadrangular | 65 | 21 | Round | 267 | — | — | 305 |
| Comparative Example 2 | 0.41 | 31 | Quadrangular | 50 | 21 | Round | 267 | — | — | 305 |
| Comparative Example 3 | 0.36 | 27.9 | Quadrangular | 63 | 16 | Round | 144 | — | — | 254 |
| Comparative Example 4 | 0.25 | 31 | Quadrangular | 65 | 21 | Round | 267 | — | — | 305 |
| Comparative Example 5 | 0.41 | 31 | Quadrangular | 50 | 21 | Round | 267 | — | — | 305 |
| Comparative Example 6 | 0.36 | 27.9 | Quadrangular | 63 | 16 | Round | 144 | — | — | 254 |
| Comparative Example 7 | 0.29 | 31 | Quadrangular | 75 | 26 | Round | 267 | — | — | 305 |
| Comparative Example 8 | 0.52 | 31 | Quadrangular | 53 | 10 | Round | 267 | — | — | 305 |
| Comparative Example 9 | 0.36 | 27.9 | Quadrangular | 70 | 25 | Round | 267 | — | — | 305 |

TABLE 4-continued

|  | Cell structure | | | Pore characteristics | | Shape of honeycomb structure | | | | |
| --- | --- | --- | --- | --- | --- | --- | --- | --- | --- | --- |
|  | Partition wall thickness [mm] | Cell density [cells/cm²] | Cell shape | Porosity [%] | Mean pore size [μm] | Sectional shape | Dia. [mm] | Long dia. [mm] | Short dia. [mm] | Total length [mm] |
| Comparative Example 10 | 0.36 | 95 | Quadrangular | 28 | 9 | Round | 267 | — | — | 305 |
| Comparative Example 11 | 0.36 | 46.5 | Quadrangular | 78 | 23 | Round | 356 | — | — | 254 |
| Comparative Example 12 | 0.46 | 38.8 | Quadrangular | 77 | 23 | Round | 356 | — | — | 254 |

TABLE 5

|  | Partition wall thickness [mm] | Cell density [cells/cm²] | Sectional area perpendicular to cell direction [cm²] | Inflow side filtration area G [cm²/cm³] | Pore volume Vp [cm³] | Total volume Va [L] | Pore volume ratio A [cm³/L] | G × A [cm²/L] | Amount of catalyst to be loaded [g/L] |
| --- | --- | --- | --- | --- | --- | --- | --- | --- | --- |
| Comparative Example 1 | 0.25 | 31 | 559.9 | 9.6 | 2780 | 17.1 | 163 | 1563 | 75 |
| Comparative Example 2 | 0.41 | 31 | 559.9 | 8.6 | 3265 | 17.1 | 191 | 1644 | 75 |
| Comparative Example 3 | 0.36 | 27.9 | 162.9 | 8.6 | 812 | 4.1 | 196 | 1688 | 75 |
| Comparative Example 4 | 0.25 | 31 | 559.9 | 9.6 | 2780 | 17.1 | 163 | 1563 | 50 |
| Comparative Example 5 | 0.41 | 31 | 559.9 | 8.6 | 3265 | 17.1 | 191 | 1644 | 50 |
| Comparative Example 6 | 0.36 | 27.9 | 162.9 | 8.6 | 812 | 4.1 | 196 | 1688 | 50 |
| Comparative Example 7 | 0.29 | 31 | 559.9 | 9.3 | 3603 | 17.1 | 211 | 1962 | 75 |
| Comparative Example 8 | 0.52 | 31 | 559.9 | 7.9 | 4255 | 17.1 | 249 | 1968 | 75 |
| Comparative Example 9 | 0.36 | 27.9 | 559.9 | 8.6 | 3935 | 17.1 | 230 | 1982 | 75 |
| Comparative Example 10 | 0.36 | 95 | 559.9 | 12.6 | 2662 | 17 | 156 | 1964 | 75 |
| Comparative Example 11 | 0.36 | 46.5 | 993.1 | 10.3 | 8105 | 25.2 | 321 | 3309 | 75 |
| Comparative Example 12 | 0.46 | 38.8 | 995.4 | 8.9 | 9166 | 25 | 363 | 3227 | 75 |

TABLE 6

|  | Pressure loss | | | | Isostatic strength | |
| --- | --- | --- | --- | --- | --- | --- |
|  | Pressure loss without catalyst [KPa] | Pressure loss with catalyst [KPa] | Pressure loss increase ratio evaluation value | Judgment | MPa | Judgment |
| Comparative Example 1 | 3.4 | 17.8 | 5.2 | C | 0.9 | C |
| Comparative Example 2 | 6.3 | 28.2 | 4.5 | C | 3.0 | A |
| Comparative Example 3 | 19.4 | 81.4 | 4.2 | C | 1.3 | B |
| Comparative Example 4 | 3.4 | 13.5 | 3.9 | C | 0.8 | C |
| Comparative Example 5 | 6.3 | 26.1 | 4.2 | C | 2.9 | A |
| Comparative Example 6 | 19.4 | 69.0 | 3.6 | C | 1.9 | B |
| Comparative Example 7 | 3.3 | 12.2 | 3.7 | C | 0.7 | C |
| Comparative Example 8 | 8.2 | 29.8 | 3.6 | C | 3.3 | A |
| Comparative Example 9 | 4.2 | 15.1 | 3.6 | C | 0.8 | C |

TABLE 6-continued

|  | Pressure loss | | | | Isostatic strength | |
|---|---|---|---|---|---|---|
|  | Pressure loss without catalyst [KPa] | Pressure loss with catalyst [KPa] | Pressure loss increase ratio evaluation value | Judgment | MPa | Judgment |
| Comparative Example 10 | 10.9 | 38.8 | 3.6 | C | 4.0 | A |
| Comparative Example 11 | 2.4 | 4.9 | 2.0 | A | 0.7 | C |
| Comparative Example 12 | 3.2 | 6.1 | 1.9 | A | 0.7 | C |

(Result)

In each of the honeycomb structures of Examples 1 to 23, both the evaluation of the pressure loss increase ratio and the evaluation of the isostatic strength were suitable results. In the honeycomb structures of Comparative Examples 1 to 10, the pressure loss increase ratio during deposition of soot on the honeycomb structure with the catalyst noticeably increases as compared with the honeycomb structures of Examples 1 to 23. In the honeycomb structures of Comparative Examples 11 and 12, the pressure loss increase ratio was low, but the isostatic strength was very low. Additionally, also as to the honeycomb structures of Comparative Examples 1, 4, 7 and 9, the isostatic strength was very low. Furthermore, in Examples 1, 2, 9 and 11, "G×A" indicated the same degree of value, and when these mean pore sizes were compared, in Examples 2, 9 and 11 in which the value of the mean pore size was 20 μm or less, more suitable result was indicated in the evaluation of the pressure loss increase ratio.

A honeycomb structure of the present invention is utilizable as an exhaust gas purifying member to purify an exhaust gas emitted from a gasoline engine, a diesel engine or the like.

DESCRIPTION OF REFERENCE NUMERALS

1: partition wall, 2: cell, 2a: inflow cell, 2b: outflow cell, 3: circumferential wall, 4: honeycomb structure body, 5: plugging portion, 11: inflow end face, 12: outflow end face, and 100: honeycomb structure.

What is claimed is:

1. A honeycomb structure comprising:
a honeycomb structure body having porous partition walls defining a plurality of cells which extend from an inflow end face to an outflow end face and become through channels for a fluid; and
plugging portions disposed in open ends of the cells on the inflow end face side or the outflow end face side,
wherein a thickness of the partition walls is 0.30 mm or more and 0.51 mm or less,
a cell density of the honeycomb structure body is 30 cells/cm² or more and 93 cells/cm² or less,
among the cells, the cells in which the plugging portions are disposed in the open ends on the outflow end face side and which are opened on the inflow end face side are defined as inflow cells,
among the cells, the cells in which the plugging portions are disposed in the open ends on the inflow end face side and which are opened on the outflow end face side are defined as outflow cells,
a filtration area (cm²) of the inflow cells included per cm³ of the honeycomb structure body is defined as an inflow side filtration area G (cm²/cm³),
a value obtained by dividing a pore volume Vp (cm³) formed in the partition walls of the honeycomb structure body by a total volume Va (L) including the cells of the honeycomb structure body is defined as a pore volume ratio A (cm³/L), and
a product of the inflow side filtration area G (cm²/cm³) and the pore volume ratio A (cm³/L) is 1800 cm²/L or more and 3200 cm²/L or less.

2. The honeycomb structure according to claim 1, wherein the product of the inflow side filtration area G (cm²/cm³) and the pore volume ratio A (cm³/L) is 1800 cm²/L or more and 3000 cm²/L or less.

3. The honeycomb structure according to claim 2, wherein the product of the inflow side filtration area G (cm²/cm³) and the pore volume ratio A (cm³/L) is 2000 cm²/L or more and 3000 cm²/L or less.

4. The honeycomb structure according to claim 1, wherein a mean pore size of the partition walls is from 12 to 20 μm.

5. The honeycomb structure according to claim 3, wherein a mean pore size of the partition walls is from 12 to 20 μm.

6. The honeycomb structure according to claim 1, wherein the honeycomb structure body contains cordierite.

7. The honeycomb structure according to claim 5, wherein the honeycomb structure body contains cordierite.

8. The honeycomb structure according to claim 1, wherein an exhaust gas purifying catalyst is loaded onto at least one of the surface of each partition wall of the honeycomb structure body and each pore of the partition wall.

9. The honeycomb structure according to claim 7, wherein an exhaust gas purifying catalyst is loaded onto at least one of the surface of each partition wall of the honeycomb structure body and each pore of the partition wall.

10. The honeycomb structure according to claim 8, wherein an amount of the catalyst to be loaded is 50 g/L or more.

11. The honeycomb structure according to claim 9, wherein an amount of the catalyst to be loaded is 50 g/L or more.

12. The honeycomb structure according to claim 10, wherein the amount of the catalyst to be loaded is 50 g/L or more and 130 g/L or less.

13. The honeycomb structure according to claim 11, wherein the amount of the catalyst to be loaded is 50 g/L or more and 130 g/L or less.

14. The honeycomb structure according to claim 8, which is for use in purification of $NO_x$ included in an exhaust gas emitted from a car.

15. The honeycomb structure according to claim 13, which is for use in purification of $NO_x$ included in an exhaust gas emitted from a car.

16. The honeycomb structure according to claim 8, wherein the catalyst is a catalyst having a selective catalytic reducing function.

17. The honeycomb structure according to claim 15, wherein the catalyst is a catalyst having a selective catalytic reducing function.

* * * * *